US012684452B2

(12) United States Patent
Das

(10) Patent No.: US 12,684,452 B2
(45) Date of Patent: Jul. 14, 2026

(54) CELLULAR RADIO SIGNAL (E.G., 5G MILLIMETER WAVE) TRANSMISSION THROUGH HIGH ENERGY EFFICIENT BUILDING MATERIALS

(71) Applicant: Manoj Kumar Das, Frisco, TX (US)

(72) Inventor: Manoj Kumar Das, Frisco, TX (US)

( * ) Notice: Subject to any disclaimer, the term of this patent is extended or adjusted under 35 U.S.C. 154(b) by 690 days.

(21) Appl. No.: 17/921,297

(22) PCT Filed: Apr. 26, 2021

(86) PCT No.: PCT/US2021/029204

§ 371 (c)(1),
(2) Date: Oct. 25, 2022

(87) PCT Pub. No.: WO2021/222123

PCT Pub. Date: Nov. 4, 2021

(65) Prior Publication Data

US 2023/0171670 A1     Jun. 1, 2023

Related U.S. Application Data

(60) Provisional application No. 63/016,185, filed on Apr. 27, 2020.

(51) Int. Cl.
*H04W 40/20* (2009.01)
*H04L 67/10* (2022.01)
(Continued)

(52) U.S. Cl.
CPC ............. *H04W 40/20* (2013.01); *H04L 67/10* (2013.01); *H04L 69/08* (2013.01); *H04W 40/22* (2013.01)

(58) Field of Classification Search
CPC ...... H04W 40/20; H04W 40/22; H04L 67/10; H04L 69/08; Y02D 30/70
See application file for complete search history.

(56) References Cited

U.S. PATENT DOCUMENTS 11,265,944 B1 * 3/2022 Marupaduga ......... H04L 1/1896
2001/0050644 A1 * 12/2001 Koshizaka ............ H01L 23/552
                                                          343/702

(Continued)

OTHER PUBLICATIONS

Hong, S., et al., "Applications of self-interference cancellation in 5G and beyond," IEEE Communications Magazine, vol. 52, Issue 2, pp. 114-121, Feb. 19, 2014.

(Continued)

*Primary Examiner* — Thinh D Tran
(74) *Attorney, Agent, or Firm* — Rahman LLC

(57) ABSTRACT
A method, system, and apparatus for improving the signal strength of millimeter wave signals inside structures received from outside of the structure. In an embodiment, a method includes receiving, at a first receiver external to a barrier, a millimeter wave signal, the millimeter wave signal comprising a wireless transmission protocol. The method also includes converting the millimeter wave signal to an optical or electrical signal using a converted protocol that preserves the original signal's stack layer. The method also includes transmitting the optical signal or the electrical signal on a conduit to a second receiver disposed on a second side of the barrier. The method also includes converting the optical or electrical signal from the protocol back to the wireless transmission protocol and transmitting the converted signal in the original wireless transmission protocol to a wireless device disposed within the structure.

21 Claims, 8 Drawing Sheets

(51) Int. Cl.
　　*H04L 69/08*　　　(2022.01)
　　*H04W 40/22*　　　(2009.01)

(56)　　　　　　　References Cited

U.S. PATENT DOCUMENTS

| | | | |
|---|---|---|---|
| 2002/0080087 A1 | 6/2002 | Takatori et al. | |
| 2008/0186143 A1* | 8/2008 | George | H04B 10/25756 |
| | | | 340/10.3 |
| 2010/0250497 A1 | 9/2010 | Redlich et al. | |
| 2013/0070772 A1* | 3/2013 | Watson | H04W 88/14 |
| | | | 370/400 |
| 2013/0316759 A1 | 11/2013 | Hayem et al. | |
| 2014/0185601 A1* | 7/2014 | Ilyadis | H04W 88/181 |
| | | | 370/338 |
| 2018/0077594 A1* | 3/2018 | He | H04L 41/0806 |
| 2019/0238202 A1* | 8/2019 | Chavva | H04B 7/0617 |
| 2020/0029262 A1* | 1/2020 | Kim | H04W 36/0085 |
| 2020/0059849 A1 | 2/2020 | Bencheikh et al. | |
| 2020/0084136 A1* | 3/2020 | Ross | H04W 92/20 |
| 2020/0221518 A1* | 7/2020 | Schmitz | H04L 41/147 |
| 2020/0329390 A1* | 10/2020 | Salahuddeen | H04W 24/08 |
| 2022/0256473 A1* | 8/2022 | Kiilerich Pratas | H04W 52/367 |

OTHER PUBLICATIONS

Das, M., PCT/US2021/029204, International Search Report, Aug. 5, 2021, 2 pages.

Das, M., PCT/US2021/029204, Written Opinion, Aug. 5, 2021, 8 pages.

* cited by examiner

200

212

230

220

220

210

BACKHAUL
NETWORK

UPLINK
CONNECTION

DOWNLINK
CONNECTION

300

314

302

310

306

312

308

304

402
416
404
422
418
420

3GPP Protocol Stack
CPRI Protocol Stack 406
408
410
412
414

PDCP (Packet Data Convergence Protocol)

RLC (Radio Link Control) Layer

MAC (Media access control layer)

Physical Layer

User Plane
Control and Management
SYNC 426
430
428

IQ Data
Vendor Specific
Ethernet
HDLC
Layer 1

TDM (Time Division Multiplexing)

432

Electrical conversion
Optical Transmission 424
434
436

500

508

506

502

504

510

512

600

602

610

606

604

Transmit and receive towards indoor users 5G mmWave receiving and regenerating device Transmit and receive towards outdoor network

608

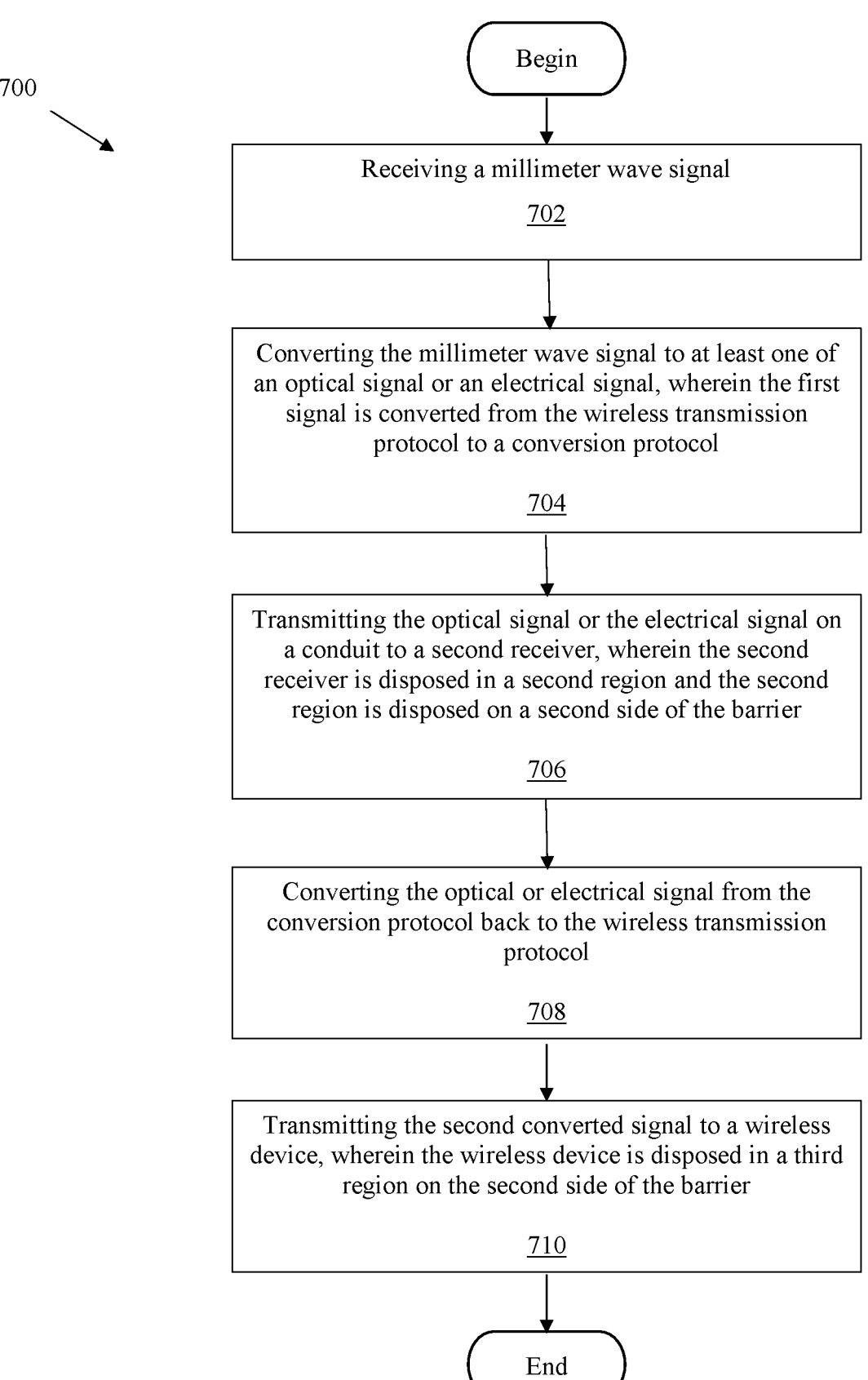

700

Begin

Receiving a millimeter wave signal

702

Converting the millimeter wave signal to at least one of an optical signal or an electrical signal, wherein the first signal is converted from the wireless transmission protocol to a conversion protocol

704

Transmitting the optical signal or the electrical signal on a conduit to a second receiver, wherein the second receiver is disposed in a second region and the second region is disposed on a second side of the barrier

706

Converting the optical or electrical signal from the conversion protocol back to the wireless transmission protocol

708

Transmitting the second converted signal to a wireless device, wherein the wireless device is disposed in a third region on the second side of the barrier

710

End

Figure 7

CELLULAR RADIO SIGNAL (E.G., 5G MILLIMETER WAVE) TRANSMISSION THROUGH HIGH ENERGY EFFICIENT BUILDING MATERIALS

CROSS-REFERENCE TO RELATED APPLICATIONS

This application claims the benefit of U.S. Provisional Patent Application Ser. No. 63/016,185 filed on Apr. 27, 2020, which is incorporated in its entirety herein by reference.

FIELD OF THE INVENTION

The present disclosure relates to wireless communication systems and, in particular, to methods and systems to enhance wireless performance within structures.

BACKGROUND $5^{th}$ Generation (5G) wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities.

Commercial buildings as well as residential buildings often use high energy efficient materials such as window panes, window frames, and door frames that obstruct higher frequency (e.g., millimeter wave) radio signals such as 5G cellular radio waves used for voice, data, video, and text messages to 5G-capable wireless devices such as smart phones and tablets. Additionally, high frequency radio signals have high attenuation through other materials as well. Therefore, wireless service within buildings may sometimes be poor, spotty, or non-existent. Many businesses offer WiFi service to employees and guests. However, this is not always available and is often not free to visitors. Thus, methods and systems that improve cellular service within manmade structures is desirable.

SUMMARY

In an illustrative embodiment, a method for improving wireless service within a region separated from a wireless transmission point by a barrier that obstructs or degrades a wireless signal. The method includes receiving, at a first receiver, a millimeter wave signal, wherein the millimeter wave signal is a first signal. The first signal includes a wireless transmission protocol having a stack layer. The first receiver is disposed in a first region and the first region is disposed on a first side of a barrier. The method further includes converting the millimeter wave signal to at least one of an optical signal or an electrical signal, wherein the first signal is converted from the wireless transmission protocol to a conversion protocol. The conversion protocol preserves the first signal's stack layer. The method further includes transmitting the optical signal or the electrical signal on a conduit to a second receiver, wherein the second receiver is disposed in a second region and the second region is disposed on a second side of the barrier. The method further includes converting the optical or electrical signal from the conversion protocol back to the wireless transmission protocol. The method further includes transmitting the second converted signal to a wireless device, wherein the wireless device is disposed in a third region on the second side of the barrier.

In an illustrative embodiment, a computer program product for improving wireless service within a region separated from a wireless transmission point by a barrier that obstructs or degrades a wireless signal is provided. The computer program product includes a non-transitory computer-readable storage medium, storing program codes executed by a processor, to perform receiving, at a first receiver, a millimeter wave signal, wherein the millimeter wave signal is a first signal, the first signal comprises a wireless transmission protocol having a stack layer, the first receiver is disposed in a first region, and the first region is disposed on a first side of a barrier. The program codes executed by the processor further cause the processor to perform converting the millimeter wave signal to at least one of an optical signal or an electrical signal, wherein the first signal is converted from the wireless transmission protocol to a conversion protocol, and the conversion protocol preserves the first signal's stack layer. The program codes executed by the processor further cause the processor to perform transmitting the optical signal or the electrical signal on a conduit to a second receiver, wherein the second receiver is disposed in a second region and the second region is disposed on a second side of the barrier. The program codes executed by the processor further cause the processor to perform converting the optical or electrical signal from the conversion protocol back to the wireless transmission protocol. The program codes executed by the processor further cause the processor to perform transmitting the second converted signal to a wireless device, wherein the wireless device is disposed in a third region on the second side of the barrier.

In an illustrative embodiment, a system for improving wireless service within a region separated from a wireless transmission point by a barrier that obstructs or degrades a wireless signal is provided. The system includes a first receiver configured to receive a millimeter wave signal, wherein the millimeter wave signal is a first signal, the first signal comprises a wireless transmission protocol having a stack layer, the first receiver is disposed in a first region, and the first region is disposed on a first side of a barrier. The first system further includes a first converter communicably coupled to the first receiver, the converter configured to convert the millimeter wave signal to at least one of an optical signal or an electrical signal, wherein the first signal is converted from the wireless transmission protocol to a conversion protocol and the conversion protocol preserves the first signal's stack layer. The system further includes a first transmitter coupled to the converter. The system further includes a conduit communicably coupled to the first transmitter. The system further includes a second receiver communicably coupled to the conduit, wherein the conduit is configured to transmit the optical signal or the electrical signal to the second receiver, wherein the second receiver is disposed in a second region and the second region is disposed on a second side of the barrier. The system further includes a second converter communicably coupled to the second receiver and configured to convert the optical or electrical signal from the conversion protocol back to the wireless transmission protocol. The system further includes a transmitter communicably coupled to the second converter and configured to transmit the second converted signal to a wireless device, wherein the wireless device is disposed in a third region on the second side of the barrier.

Implementations may include one or more of the following features: wherein the barrier comprises an energy absorbing material; wherein the barrier comprises an obstacle occluding line-of-sight between the wireless device and a transmitter broadcasting the millimeter wave signal to the first receiver; wherein a distance between the wireless device and the second side of the barrier is less than a distance between the wireless device and the first side of the barrier; wherein the first receiver is a first transceiver and the second receiver is a second transceiver; wherein the wireless transmission protocol comprises a 3GPP protocol stack; and wherein the conversion protocol comprises a CPRI protocol stack.

BRIEF DESCRIPTION OF THE DRAWINGS

Representative features of illustrative examples are set forth in the appended claims. Illustrative examples, however, as well as representatively described modes of use, further objectives, and features thereof, will best be understood by reference to the following detailed description of illustrative examples of the present disclosure when read in conjunction with accompanying drawings, wherein:

FIG. 7 shows a method for regenerating high frequency radio signals inside of a building or structure is depicted in accordance with an illustrative embodiment;

DETAILED DESCRIPTION

Figure 1:
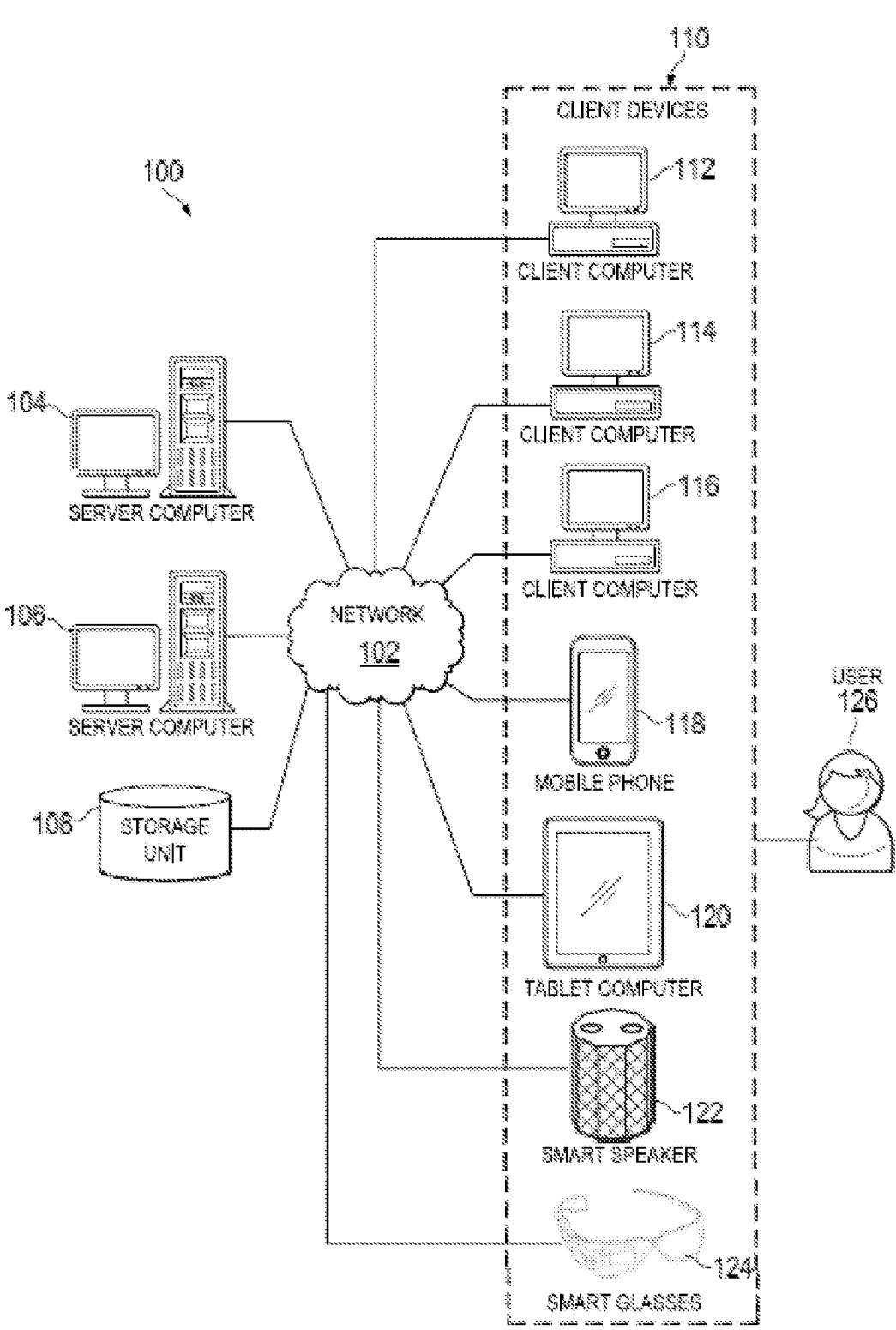
FIG. 1 is a pictorial representation of a network of data processing systems is depicted in which illustrative examples may be implemented.

Disclosed herein are methods, systems, and devices to regenerate radio waves inside buildings, such as residential buildings, commercial buildings, stadiums, arenas, large resorts, casinos, and the like, using modern building materials to facilitate regeneration of radio signals. Illustrative embodiments recognize and take into account that cellular wireless service providers, as well as building owners, can use the disclosed methods to augment cellular wireless service inside buildings. Illustrative embodiments also recognize and take into account that the disclosed methods will save cost of deployment of Distributed Antenna Systems (DAS). Embodiments of this disclosure are frequency specific and/or wireless service provider specific. In various embodiments, the disclosed methods regenerate one wireless service provider's or multiple wireless service providers' high frequency radio signals inside a structure, thereby mitigating effects of signal strength loss in millimeter wavelength signals resulting from barriers or line-of-sight configuration. Embodiments of the disclosure provide a solution for the current lack of 5G or millimeter wave radio signal strength inside of facilities due to high energy efficient building materials. Thus, embodiments of the disclosure provide 5G millimeter wave radio signals through high efficiency building materials.

Some or all of the above-identified technical problems can be addressed with, e.g., a signal regeneration system or method, as described herein, that includes an external transceiver, an external signal converter that converts the wireless signal from a wireless protocol to a protocol suitable for physical transmission via electrical or optical signals, a physical signal propagating material (e.g., electrical conductive cable or optical cable) connecting the external signal converter to an internal signal converter, the internal signal converter converting electrical or optical signal into the original wireless protocol, and an internal transceiver that transmits the millimeter wireless signal to a wireless device inside the structure using the original wireless protocol. The process can be reversed to transmit a millimeter wireless signal from a wireless device inside the structure to the external wireless provider.

Formation or disposition of a first feature "over" or "on" a second feature may include examples in which the first and second features are formed in direct contact, and may also include examples in which additional features may be formed between the first and second features, such that the first and second features may not be in direct contact. Spatially relative terms, such as "up," "down," "under," "beneath," "below," "lower," "upper," "above," "over," "higher," "adjacent," "interjacent," "interposed," "between," or the like, may be used herein for ease of description to representatively describe one or more elements or features in relation to other elements or features as representatively illustrated in the drawings. Spatially relative terms are intended to encompass different orientations of devices or objects in use or operation, in addition to orientations illustrated in the drawings. An apparatus, device, or object may be otherwise spatially transformed— for example, rotated by 90 degrees—and the spatially relative descriptors used herein may likewise be interpreted accordingly.

Flowcharts and block diagrams in different examples may illustrate architecture, functionality, and operation of some possible implementations of apparatuses and methods in illustrative examples. In this regard, each block in flowcharts or block diagrams can represent at least one of a module, a segment, a function, or a portion of an operation or step. The illustrations are not meant to imply physical or architectural limitations to the manner in which illustrative examples may be implemented. Other components in addition to or in place of ones illustrated may be used. Some components may be unnecessary. Additionally, blocks are presented to illustrate some functional components. One or more blocks may be combined, divided, or combined and divided into different blocks when implemented in an illustrative example.

As used herein, the phrase "at least one of," when used with a list of items, means different combinations of one or more of the listed items can be used, and only one of each item in the list may be needed. In other words, "at least one of" means any combination of items or number of items can be used from the list, but not all of the items in the list are required. The item can be a particular object, a thing, or a category. For example, without limitation, "at least one of item A, item B, or item C" may include item A, item A and item B, or item B. This example also may include item A and item B and item C, or item B and item C. Of course, any permutation or combination of these items can be present. In some illustrative examples, "at least one of" can be, for example, without limitation: two of item A, one of item B, and ten of item C; four of item B and seven of item C; or other suitable combinations.

As used herein, the terms "comprises," "comprising," "includes," "including," "has," "having," or any contextual variant thereof, are intended to cover a non-exclusive inclusion. For example, a process, product, composition, article, or apparatus that comprises a list of elements is not necessarily limited to only those elements, but may include other elements not expressly listed or inherent to such process, product, composition, article, or apparatus.

Furthermore, unless expressly stated to the contrary, "or" refers to an inclusive or, and not an exclusive or. That is, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless the context clearly indicates otherwise. Also, as used in the description herein, the meaning of "in" includes "in" and "on," unless the context clearly indicates otherwise.

Although methods, steps, operations, or procedures are presented in a specific order, this order may be changed in different examples. In some examples, to the extent multiple steps are shown as sequential in the specification, drawings, or claims, some combination of such operations in other examples may be performed at a same time or in a different order. The sequence of operations described herein may be interrupted, suspended, or otherwise controlled by another process.

In some implementations of illustrative examples described herein, one or more functions noted in the blocks can occur out of the order noted in the drawings. For example, in some cases, two blocks shown in succession may be performed substantially concurrently, or the blocks may sometimes be performed in reverse order, depending on functionality involved. Also, other blocks may be added in addition to the illustrated blocks in a flowchart or block diagram. In still other examples, one or more blocks may be optionally omitted.

Examples or illustrations provided herein are not to be regarded in any way as restrictions on, limits to, or express definitions of any term or terms with which they are associated. Instead, the examples or illustrations are to be regarded as being described with respect to a particular example and as merely illustrative. Those skilled in the art will appreciate that any term or terms with which these examples or illustrations are associated will encompass other examples that may or may not be given therewith or elsewhere in the specification, and all such examples are intended to be included within the scope of that term or those terms. Language designating such non-limiting examples and illustrations includes, but is not limited to: "for example," "for instance," "in an example," "in one example," or the like. Reference throughout this specification to "one example," "an example," "an illustrative example," "a particular example," or "a specific example," or contextually similar terminology, means that a particular feature, structure, property, or characteristic described in connection with the example is included in at least one example and may not necessarily be present in all examples.

Thus, respective appearances of the phrases "in an example," "in an illustrative example," or "in a specific example," or similar terminology in various places throughout the specification are not necessarily referring to the same example. Use of the term "example," or contextual variants thereof, in no way indicates admission of prior art.

Furthermore, particular features, structures, properties, or characteristics of any specific example may be combined in any suitable manner with one or more other examples. In illustrative examples, uniform hatching, or absence of hatching, illustrated in the drawings may correspond to a substantially homogenous material. In other illustrative examples, unitary hatching, or absence of hatching, may represent one or more component material layers.

With reference now to the figures and, in particular, with reference to FIG. 1, a pictorial representation of a network of data processing systems is depicted in which illustrative examples may be implemented. Network data processing system 100 is an illustrative example of a network of physical computers in which the illustrative examples may be implemented, other possible implementations including virtual devices on the cloud or combinations of physical and virtual devices. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102, along with storage unit 108. In addition, client devices 110 connect to network 102. As depicted, client devices 110 include client computer 112, client computer 114, and client computer 116. Further, client devices 110 can also include other types of client devices such as mobile phone 118, tablet computer 120, or the like. Client devices 110 can be, for example, computers, workstations, or network computers. In the depicted example, server computer 104 provides information, such as boot files, operating system images, and applications to client devices 110. Other possible implementations may include the deployment of virtual storage media and devices for the execution of coded instructions on cloud storage. In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, or other devices not shown. Client devices 110 connect to network 102 utilizing at least one of wired, optical fiber, or wireless connections.

Program code located in network data processing system 100 can be stored on one or more computer-recordable physical or virtual storage media and downloaded to one or more physical or virtual data processing systems or other devices for use. For example, program code can be stored on a computer-recordable storage medium on server computer 104 and downloaded to client devices 110 over network 102 for use on client devices 110.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), a wide area network (WAN), a personal area network (PAN), or the like. Network 102 may be comprised of one or more Internet-of-Things (IoT) devices. FIG. 1 is intended as an example, and not as an architectural limitation for various illustrative examples.

As used herein, "a number of" when used with reference to items, means one or more items. For example, "a number of different types of networks" is one or more different types of networks.

Figure 2:
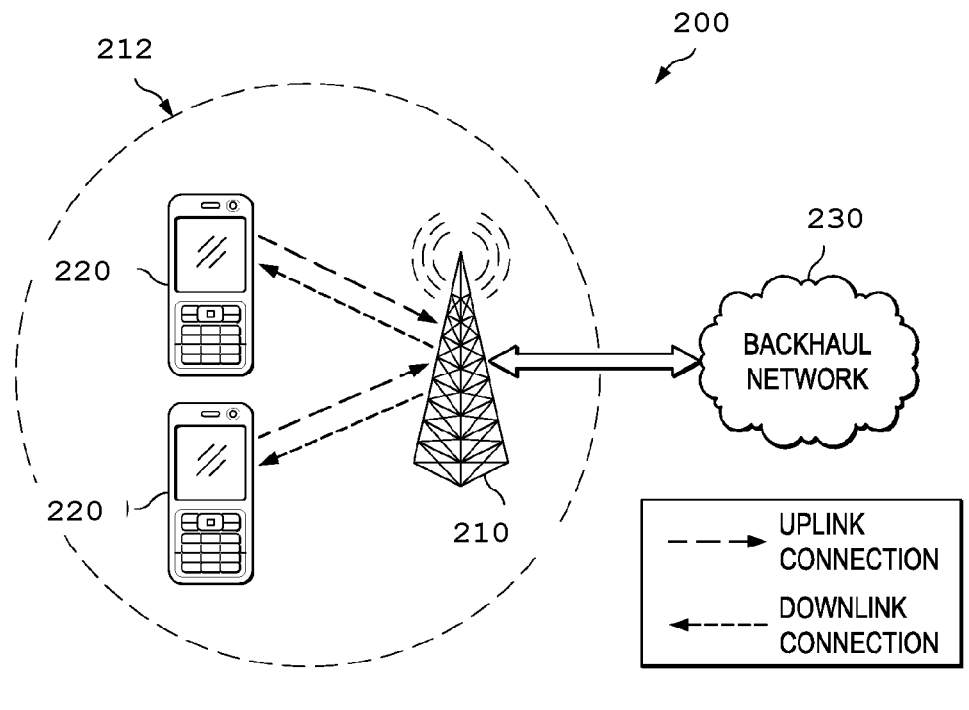
FIG. 2 illustrates a network for communicating data.

FIG. 2 illustrates a network 200 for communicating data. In a representative example, network 200 may be a $5^{th}$ Generation (5G) network utilizing new radio (NR) radio access technology (RAT). Network 200 comprises an access point (AP) 110 having a coverage area 212, a plurality of user equipment (UEs) 220, and a backhaul network 230. As used herein, the term AP may also be referred to as a transmission point (TP) and the two terms may be used interchangeably throughout this disclosure. AP 210 may comprise any component capable of providing wireless access by, inter alia, establishing uplink (dashed line) or downlink (dotted line) connections with UEs 220, such as a base station transceiver (BST), an enhanced base station (eNB), a Next Generation NodeB (gNB), a femtocell, and other wirelessly enabled devices. UEs 220 may comprise any component capable of establishing a wireless connection with AP 210. Backhaul network 230 may be any component or collection of components that allow data to be exchanged between AP 210 and a remote end (not shown). In some examples, network 200 may comprise various other wireless devices, such as relays, femtocells, or the like. As shown in FIG. 2, the transmission/reception from controller to a UE is called downlink (DL) transmission/reception, and the transmission/reception from a UE to a controller is called uplink (UL) transmission/reception.

In Orthogonal Frequency-Division Multiplexing (OFDM) systems, the frequency bandwidth is divided into multiple subcarriers in frequency domain. In time domain, one subframe is divided into multiple OFDM symbols. The OFDM symbol may have a cyclic prefix to avoid inter-symbol interference due to multiple path delays. One resource element (RE) is defined by the time-frequency resource within one subcarrier and one OFDM symbol. A reference signal and other signals, such as data channel (e.g., physical downlink shared channel (PDSCH)) and control channel (e.g., physical downlink control channel (PDCCH)) are orthogonal and multiplexed in different resource elements in time-frequency domain. Further, the signals are modulated and mapped into resource elements. Using inverse Fourier transform per each OFDM symbol, the signals in frequency domain are transformed into the signals in time domain, and are transmitted with added cyclic prefix to avoid inter-symbol interference.

Turning now to FIGS. 3-6, systems for regenerating high frequency radio signals inside of a building and protocols for transmitting the signal into the building are depicted in accordance with a representative example. The systems can be implemented in, for example, network 100 or network 200.

Figure 3:
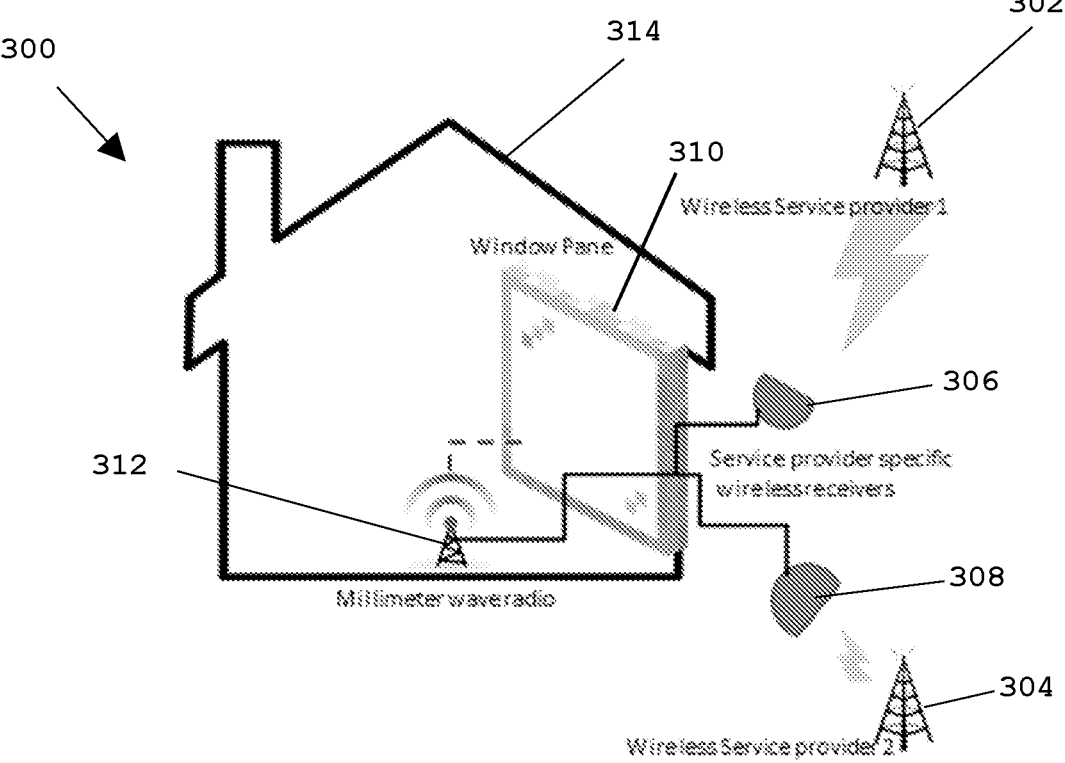
FIG. 3 shows a system for regenerating high frequency radio signals inside of a building or structure in accordance with an illustrative embodiment.

FIG. 3 shows a system 300 for regenerating high frequency radio signals inside of a building or structure in accordance with an illustrative embodiment. System 300 may be implemented in conjunction with either of network 100 or network 200 in order to enhance and improve the wireless signal strength and data transmission within structures. System 300 includes a wireless service provider 1 TP 302 and a wireless service provider 2 TP 304. System 304 also includes one or more service provider specific wireless receivers 306, 308 located outside of a building 314. Additionally, the system 300 includes an external protocol converter which may be incorporated within one or both of service provider specific wireless receivers 306, 308. The service provider specific millimeter wave signal received outside the building from one of the TPs 302, 304 with one of wireless receivers 306, 308 is authenticated, amplified, and converted to a protocol suitable for transmission over a physical signal transmission media, such as an electrically conductive waveguide or optical waveguide.

In an example, the wireless protocol is converted to CPRI (Common Public Radio Interface) protocol. Alternatively, the radio signals after authentication will be reverse converted in 3GPP ($3^{rd}$ Generation Partner Project) protocol stack up to the packet data convergence protocol (PDCP) layer. The converted signal is transmitted into the inside of the building where it is decoded. The original provider specific protocol is recreated, and a millimeter wave wireless signal is generated and transmitted to a wireless device inside of the building by an internal transceiver. In other words, once either of the CPRI or PDCP signals reaches inside the building, it will be connected to the 5G signal generator (e.g., the internal millimeter wave wireless signal transceiver). The 5G mm wave signal generators are wireless service provider specific; they will ingest CPRI or PDCP signals and regenerate service provider specific 5G mm wave signals inside the building. When the wireless devices and users receive the wireless signal, they will be able to decode the PSS (Primary Synchronization Signal), SSS (Secondary Synchronization Signal), eCGI (Evolved Cell Global Identity), PCI (Physical Cell Identity), RSI (Root Sequence Index), and will be successfully authenticated by the 5G MM wave radio network, and successfully provided voice, data, video or Internet of Things (IoT) communication. The external transceiver and internal transceiver can be connected by a physical signal propagating medium, such as an electrical wire or an optical fiber. The wireless signal is converted into an electrical or optical signal and transmitted via the physical wire or fiber from the outside receiver to the inside receiver.

The indoor wireless transceiver can also receive signals from wireless devices located within the building and convert the signals into a protocol suitable for transmission via an electrical or optical signal using a physical transmission medium to the external transceiver, which then converts the signal back into the original service provider specific millimeter wave (e.g., 5G) signal and transmits wireless back to the wireless service provider transmission point (e.g., a gNB).

In a representative example, the service provider specific wireless receiver is not necessarily an external device, as shown in the diagram in FIG. 3. In a representative example, a metal strip on each side of a windowpane is concealed behind the window or door frame can be used as an antenna. In an illustrative embodiment, the metal strip on the outside of the building receives all of the signals from the wireless service providers and sends the received signals to the external receiver. The external receiver is programmed with a SIM card or other mechanism to only decode, for example, 5G mm wave signals for a specific wireless service provider or for multiple wireless service providers.

In an illustrative embodiment, an impedance matching circuit is used to match the input impedance of the receiving device before connecting to the receiving device. The metal strip can have any impedance but, in an illustrative embodiment, the impedance matching device only matches the impedance of mm waves to receive (and transmit) only the mm wave signal and reject all other radio signals. As mentioned above, that mm wave signal can be from several mm wave wireless service providers, the external receiver only decodes the signal of one or multiple service providers (i.e., the one or more service providers for which it is configured to work with) to further break down to CPRI or PDCP.

In a representative example, the receiving device may not be visible. For example, in a representative embodiment, the receiving device is placed behind a false ceiling. In an illustrative embodiment, the receiving device is connected to an electrical energy source. In a representative aspect, the mm wave radio inside the building is connected to the metal strip inside of the windowpane with proper impedance matching, and the metal strip can be used as a transmitting antenna. In an illustrative embodiment, the inside metal strip is used as an antenna to transmit the regenerated signals inside the building for the wireless devices inside the building and also receive signals from the wireless devices inside the building. The outside metal strip will receive the signal coming from the towers of the wireless service providers and, in an illustrative embodiment, also transmits the signal coming from the indoor mobile devices towards the 5G mm wave towers.

Figure 5:
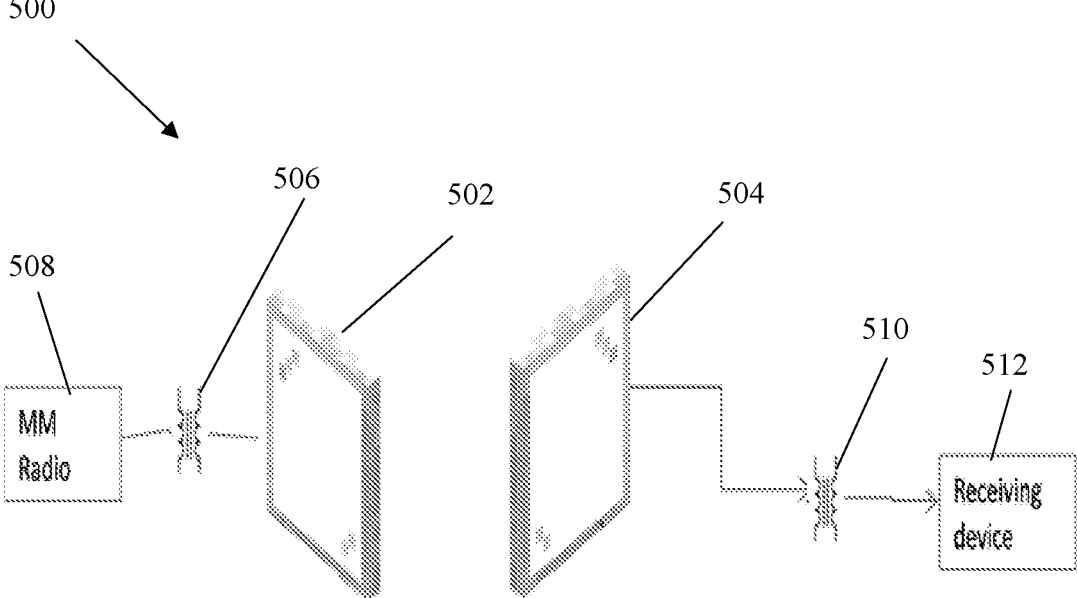
FIG. 5 shows a system for regenerating high frequency radio signals inside of a building or structure is depicted in accordance with an illustrative embodiment.

Turning now to FIG. 5 a system 500 for regenerating high frequency radio signals inside of a building or structure is depicted in accordance with an illustrative embodiment. System 500 includes metal plates 502, 504 that may be, for example, the metal frame surrounding a window, wherein metal plate 502 is an outside metal frame and metal plate 504 is an inside metal frame. System 500 also includes a millimeter (mm) wave radio 508 and an impedance matching device 506 matching the impedance of the metal plate 502 to the MM radio 508. System 500 also includes an impedance matching device 510 to match the impedance of the receiving device 512 inside the structure with the metal plate 504.

Figure 6:
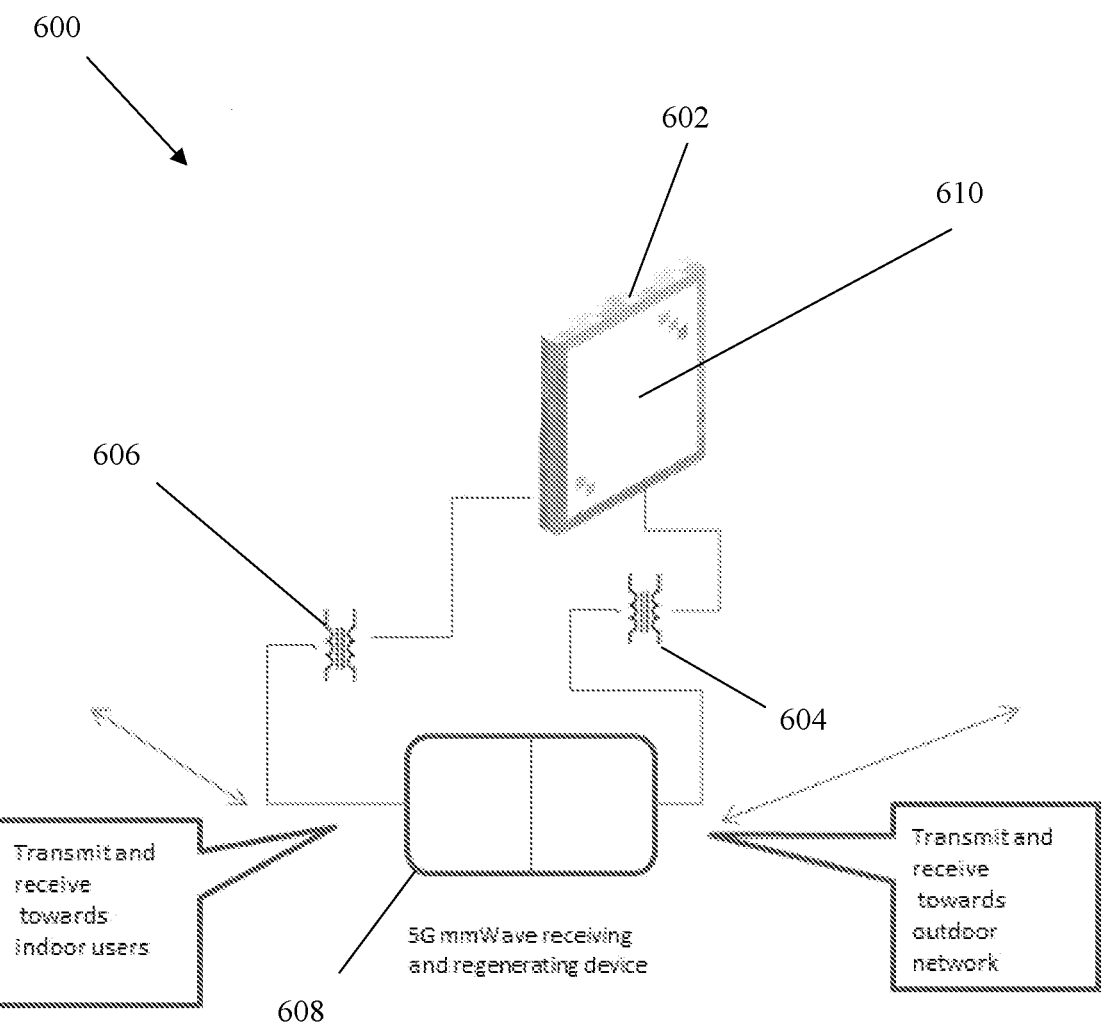
FIG. 6 shows a system for regenerating high frequency radio signals inside of a building or structure is depicted in accordance with an illustrative embodiment.

Turning now to FIG. 6 a system 600 for regenerating high frequency radio signals inside of a building or structure is depicted in accordance with an illustrative embodiment. System 600 includes a barrier 610 such as, for example, a window, surrounded by a metal plate 602. System 600 also includes impedance matching devices 606, 604 to match the impedance of the metal plates 602, 610 with the receivers in device 608. In an illustrative embodiment, rather than having separate devices inside and outside the building, a single device 608, as shown in FIG. 6, receives the 5G signals from the wireless service provider tower via, for example, the outer wire frame of a window functioning as an antenna or an antenna located external to the building. The signal is then regenerated by an indoor transceiver and transmitted to wireless devices located within the building through using the inside metal frame of the window functioning as an antenna for transmitting and receiving 5G signals within the building. The 5G signals from the wireless devices inside the building are received by the inside metal frame of the window which is functioning as an antenna and received by the 5G mm wave receiving and regenerating device, which then regenerates the 5G signal and transmits it through the external antenna (e.g., the outside metal frame of the window or a physically distinct antenna located outside the building) to the 5G wireless service provider.

Figure 4:
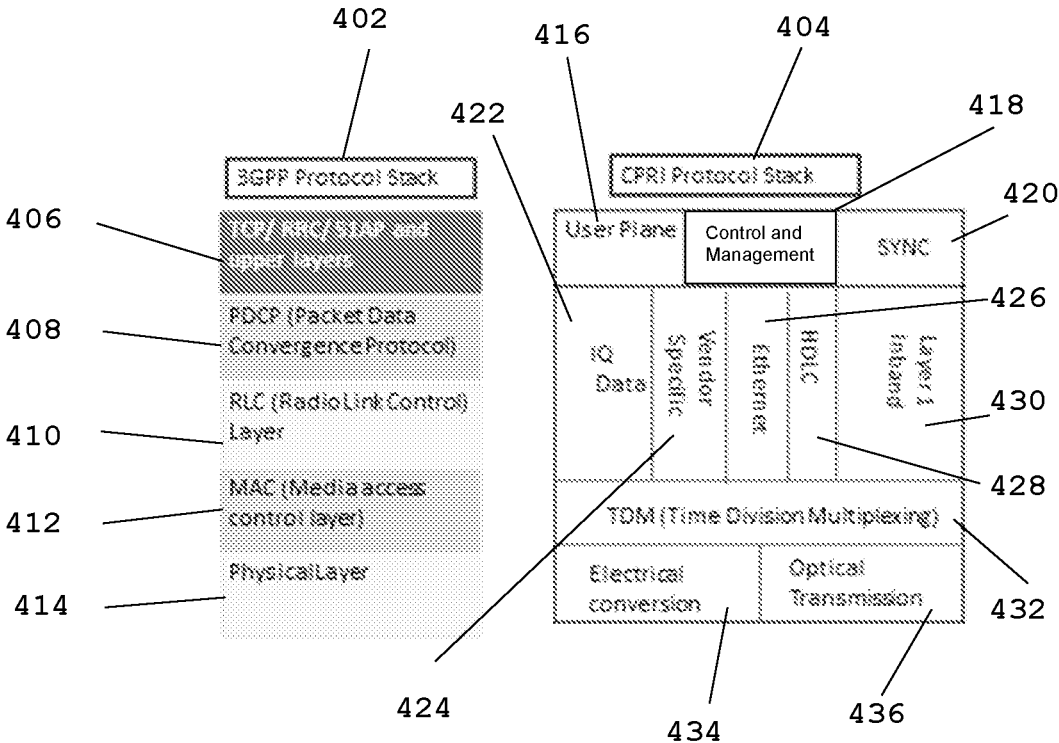
FIG. 4 shows examples of a 3GPP protocol stack and a CPRI protocol stack that may be used in a representative example to convert the provider specific signal protocol to a protocol suitable for transmission via an electrical or optical physical signal propagating medium.

FIG. 4 shows examples of a 3GPP protocol stack 402 and a Common Public Radio Interface (CPRI) protocol stack 404 that may be used in a representative example to convert the provider specific signal protocol to a protocol suitable for transmission via an electrical or optical physical signal propagating medium. 3GPP protocol stack 402 is an example of a provider specific signal protocol. 3GPP protocol stack 402 includes a transmission control protocol (TCP)/radio resource control (RRC)/S1 Application Protocol (S1AP) and upper layers 406, a packet data convergence protocol (PDCP) layer 408, a radio link control (RLC) layer 410, a Media access control layer (MAC) 412 and a physical layer 414. CPRI protocol stack 404 includes a user plane 416, control and management 418, a SYNC 420, IQ data 422, vendor specific layer 424, ethernet layer 416, HDLC layer 428, layer 1 inband 430, Time division multiplexing (TDM) 432, electrical conversion layer 434, and optical transmission layer 436. In illustrative embodiments, the systems disclosed herein convert the 3GPP protocol stack into a CPRI protocol stack for transmitting the received wireless signal across a barrier via an electrical or optical conduit.

FIG. 7 shows a flowchart of an exemplary method 700 for improving transmission of wireless signals across a barrier depicted in accordance with an illustrative embodiment. The method begins at block 702 where a first receiver receives a millimeter wave signal, wherein the millimeter wave signal is a first signal. The first signal includes a wireless transmission protocol having a stack layer. The first receiver is disposed in a first region and the first region is disposed on a first side of a barrier. The method 700 further includes at block 704 converting the millimeter wave signal to at least one of an optical signal or an electrical signal, wherein the first signal is converted from the wireless transmission protocol to a conversion protocol. The conversion protocol preserves the first signal's stack layer. The method 700 further includes at block 706 transmitting the optical signal or the electrical signal on a conduit to a second receiver, wherein the second receiver is disposed in a second region and the second region is disposed on a second side of the barrier. The method 700 further includes at block 708 converting the optical or electrical signal from the conversion protocol back to the wireless transmission protocol. The method 700 further includes at block 710 transmitting the second converted signal to a wireless device, wherein the wireless device is disposed in a third region on the second side of the barrier.

Figure 8:
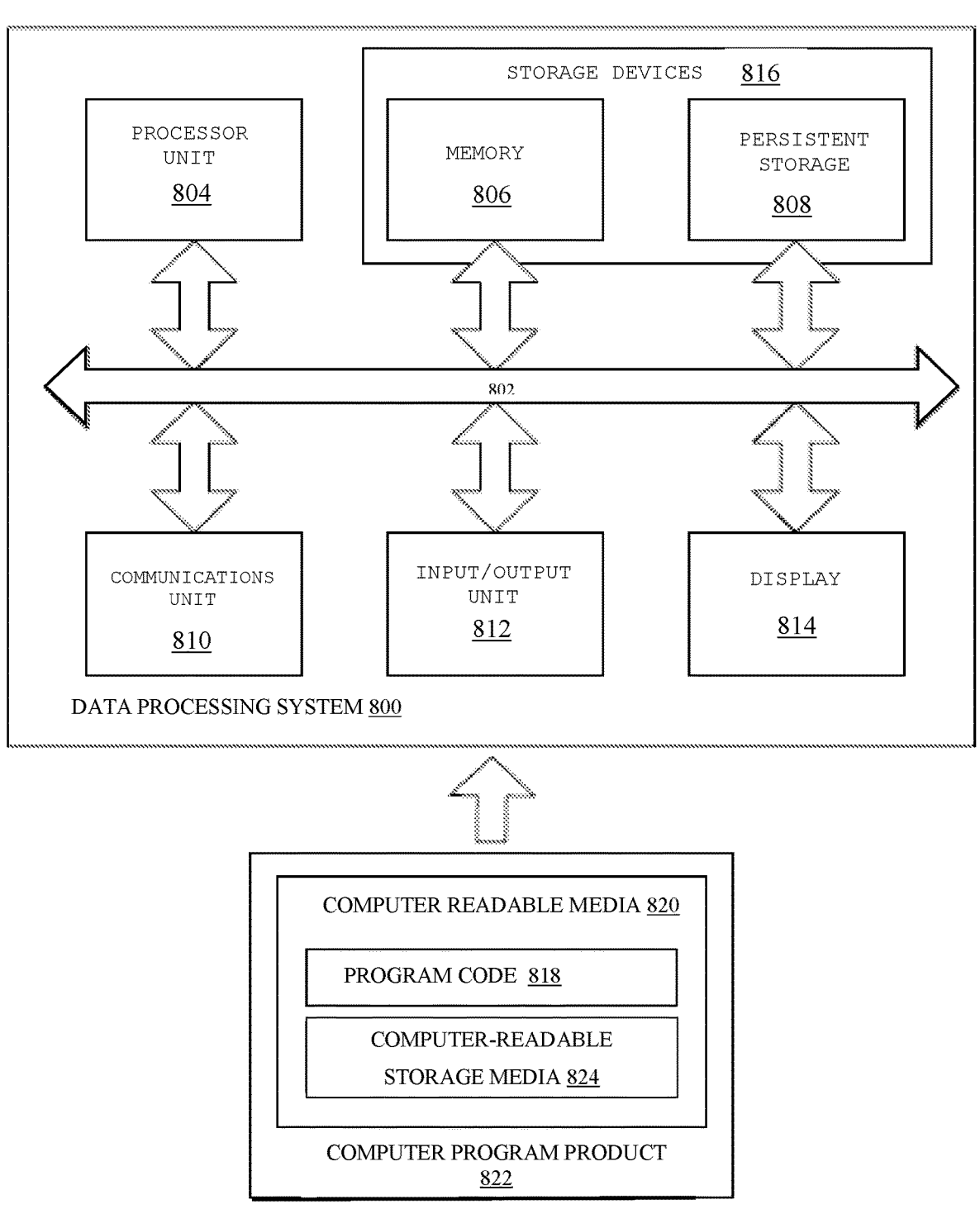
FIG. 8 is a block diagram of a data processing system depicted in accordance with a representative example, whether physically localized or on the cloud.

Turning now to FIG. 8, a block diagram of a data processing system is depicted in accordance with a representative example, whether physically localized or on the cloud. Data processing system 800 can be used to implement server computer 104, server computer 106, or one or more of client devices 110, in FIG. 1 or one or more of UEs 220 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. For example, processor unit 804 can may be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806 in these examples can be, for example, a random-access memory or any other suitable volatile or non-volatile storage device. Persistent storage 808 may take various forms, depending on particular implementations.

For example, persistent storage 808 may contain one or more components or devices. For example, persistent storage 808 can be a hard drive, a solid-state drive (SSD), a flash memory, a rewritable optical disk, a rewritable magnetic tape, or some combination thereof. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Display 814 provides a mechanism to display information to a user.

Instructions for at least one of the operating system, applications, or programs can be located in storage devices 816, which are in communication with processor unit 804 through communications framework 802. The processes of different examples can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different examples can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media" can be singular or plural. For example, program code 818 can be located in computer-readable media 820 in the form of a single storage device or system. In another example, program code 818 can be located in computer-readable media 820 that is distributed in multiple data processing systems. In other words, some instructions in program code 818 can be located in one data processing system while other instructions in in program code 818 can be located in one data processing system. For example, a portion of program code 818 can be located in computer-readable media 820 in a server computer, while another portion of program code 818 can be located in computer-readable media 820 located in a set of client computers.

In an illustrative embodiment, a method for improving wireless service within a region separated from a wireless transmission point by a barrier that obstructs or degrades a wireless signal. The method includes receiving, at a first receiver, a millimeter wave signal, wherein the millimeter wave signal is a first signal. The first signal includes a wireless transmission protocol having a stack layer. The first receiver is disposed in a first region and the first region is disposed on a first side of a barrier. The method further includes converting the millimeter wave signal to at least one of an optical signal or an electrical signal, wherein the first signal is converted from the wireless transmission protocol to a conversion protocol. The conversion protocol preserves the first signal's stack layer. The method further includes transmitting the optical signal or the electrical signal on a conduit to a second receiver, wherein the second receiver is disposed in a second region and the second region is disposed on a second side of the barrier. The method further includes converting the optical or electrical signal from the conversion protocol back to the wireless transmission protocol. The method further includes transmitting the second converted signal to a wireless device, wherein the wireless device is disposed in a third region on the second side of the barrier.

In an illustrative embodiment, a computer program product for improving wireless service within a region separated from a wireless transmission point by a barrier that obstructs or degrades a wireless signal is provided. The computer program product includes a non-transitory computer-readable storage medium, storing program codes executed by a processor, to perform receiving, at a first receiver, a millimeter wave signal, wherein the millimeter wave signal is a first signal, the first signal comprises a wireless transmission protocol having a stack layer, the first receiver is disposed in a first region, and the first region is disposed on a first side of a barrier. The program codes executed by the processor further cause the processor to perform converting the millimeter wave signal to at least one of an optical signal or an electrical signal, wherein the first signal is converted from the wireless transmission protocol to a conversion protocol, and the conversion protocol preserves the first signal's stack layer. The program codes executed by the processor further cause the processor to perform transmitting the optical signal or the electrical signal on a conduit to a second receiver, wherein the second receiver is disposed in a second region and the second region is disposed on a second side of the barrier. The program codes executed by the processor further cause the processor to perform converting the optical or electrical signal from the conversion protocol back to the wireless transmission protocol. The program codes executed by the processor further cause the processor to perform transmitting the second converted signal to a wireless device, wherein the wireless device is disposed in a third region on the second side of the barrier.

In an illustrative embodiment, a system for improving wireless service within a region separated from a wireless transmission point by a barrier that obstructs or degrades a wireless signal is provided. The system includes a first receiver configured to receive a millimeter wave signal, wherein the millimeter wave signal is a first signal, the first signal comprises a wireless transmission protocol having a stack layer, the first receiver is disposed in a first region, and the first region is disposed on a first side of a barrier. The first system further includes a first converter communicably coupled to the first receiver, the converter configured to convert the millimeter wave signal to at least one of an optical signal or an electrical signal, wherein the first signal is converted from the wireless transmission protocol to a conversion protocol and the conversion protocol preserves the first signal's stack layer. The system further includes a first transmitter coupled to the converter. The system further includes a conduit communicably coupled to the first transmitter. The system further includes a second receiver communicably coupled to the conduit, wherein the conduit is configured to transmit the optical signal or the electrical signal to the second receiver, wherein the second receiver is disposed in a second region and the second region is disposed on a second side of the barrier. The system further includes a second converter communicably coupled to the second receiver and configured to convert the optical or electrical signal from the conversion protocol back to the wireless transmission protocol. The system further includes a transmitter communicably coupled to the second converter and configured to transmit the second converted signal to a wireless device, wherein the wireless device is disposed in a third region on the second side of the barrier.

Implementations may include one or more of the following features: wherein the barrier comprises an energy absorbing material; wherein the barrier comprises an obstacle occluding line-of-sight between the wireless device and a transmitter broadcasting the millimeter wave signal to the first receiver; wherein a distance between the wireless device and the second side of the barrier is less than a distance between the wireless device and the first side of the barrier; wherein the first receiver is a first transceiver and the second receiver is a second transceiver; wherein the wireless transmission protocol comprises a 3GPP protocol stack; and wherein the conversion protocol comprises a CPRI protocol stack.

Figure 9:
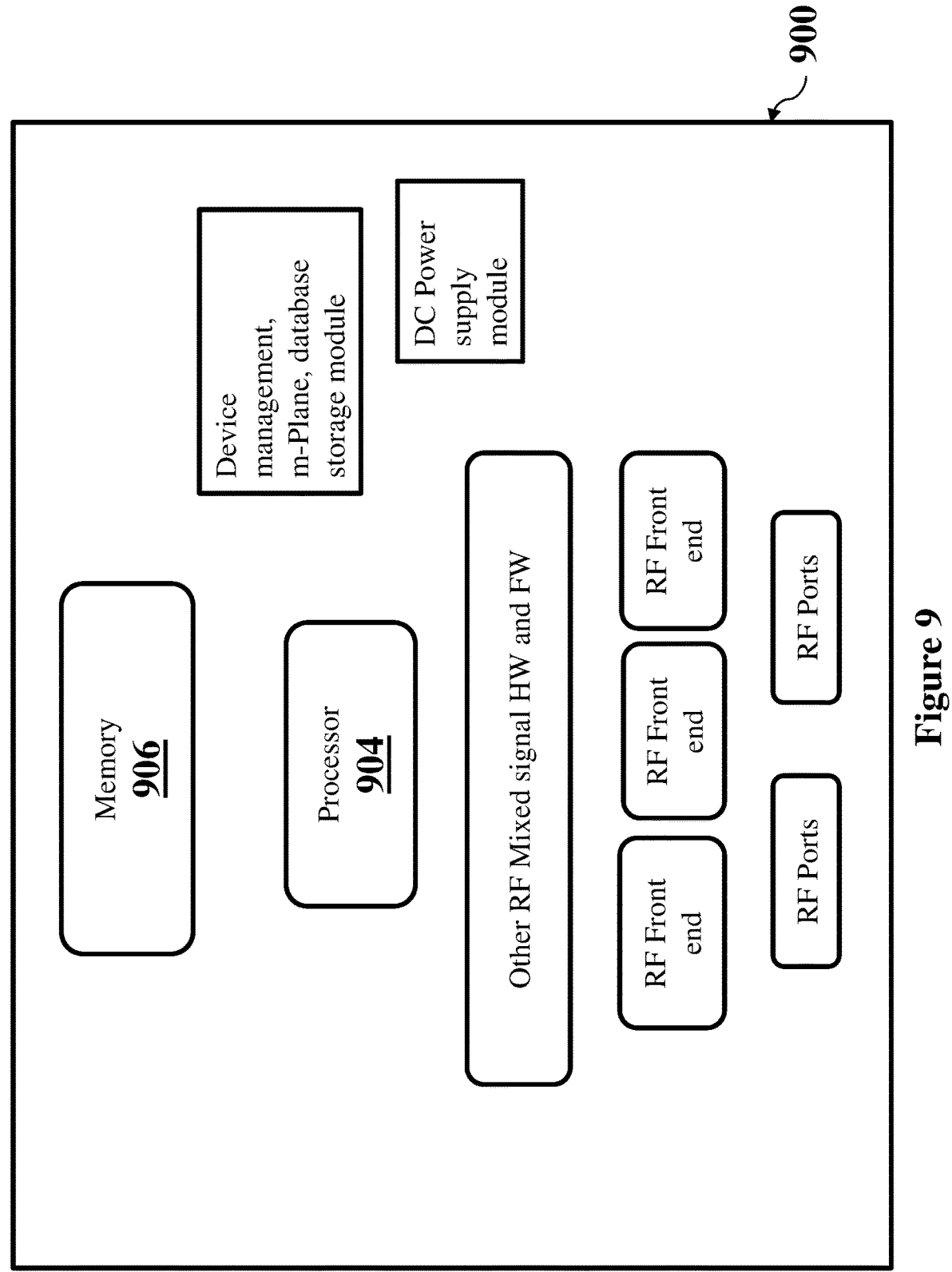
FIG. 9 is a block diagram of a data processing system depicted in accordance with an illustrative example.

Different components illustrated for data processing system 900 are not meant to provide architectural limitations to the manner in which different examples can be implemented. In some illustrative examples, one or more of the components may be incorporated in or otherwise form a portion of another component. For example, memory 906, or portions thereof, may be incorporated in processor unit 904 in some representative aspects. Different illustrative examples can be implemented in a data processing system including components in addition to or in place of those illustrated for data processing system 900. Other components shown in FIG. 9 can be varied from the illustrative examples shown. The different examples can be implemented using any hardware device or system capable of running program code 818.

It is understood that any and all media, devices, and physical hardware components depicted in FIGS. 1-3 and 5-7 can be substituted by virtual devices deployable, in part or in whole, with a cloud-based implementation.

Descriptions of different illustrative examples has been presented for purposes of illustration and description, and are not intended to be exhaustive or limited to the examples in the form disclosed. The different illustrative examples describe components that perform actions or operations. In an illustrative example, a component can be configured to perform action or operation described. For example, a component can have a configuration or design for a structure that provides the component an ability to perform the action or operation that is described in the illustrative examples as being performed by the component.

Many modifications and variations will be apparent to those of ordinary skill in the art without departing from the scope and spirit of the described examples. Furthermore, different illustrative examples may provide different features as compared to other examples. The examples or examples selected are chosen and described in order to explain principles of the examples, practical application, and to enable others of ordinary skill in the art to understand the disclosure for various examples with various modifications as are suited to one or more particular contemplated uses. The terminology used herein was chosen to best explain the principles of the examples, the practical application or technical improvement over technologies found in the marketplace, or to enable others of ordinary skill in the art to understand the embodiments disclosed here.

The invention claimed is:

1. A method for improving wireless service within a region separated from a wireless transmission point by a barrier that obstructs or degrades a wireless signal, comprising:

receiving, at a first receiver that is programmed with a SIM card or other mechanism to only decode millimeter wave signals for a specific wireless service provider, a millimeter wave signal, wherein:

the millimeter wave signal is a first signal;

the first signal comprises a wireless transmission protocol having a stack layer;

the first receiver is disposed in a first region; and the first region is disposed on a first side of the barrier, wherein the barrier comprises an energy absorbing material comprising at least one of a high energy efficient building material, a window pane, a window frame, or a door frame that obstructs the millimeter wave signal;

authenticating the millimeter wave signal to verify the specific wireless service provider;

amplifying the millimeter wave signal after authentication;

converting an amplified millimeter wave signal to at least one of an optical signal or an electrical signal, wherein:

the first signal is converted from the wireless transmission protocol to a conversion protocol; and the conversion protocol preserves the first signal's stack layer;

transmitting the optical signal or the electrical signal on a conduit to a second receiver, wherein:

the second receiver is disposed in a second region; and the second region is disposed on a second side of the barrier;

converting the optical or electrical signal from the conversion protocol back to the wireless transmission protocol;

recreating an original provider specific protocol and generating a millimeter wave wireless signal that exceeds an original wireless RF signal, wherein the millimeter wave wireless signal includes network parameters enabling a wireless device to decode a Primary Synchronization Signal (PSS), a Secondary Synchronization Signal (SSS), an Evolved Cell Global Identity (eCGI), a Physical Cell Identity (PCI), and a Root Sequence Index (RSI) for authentication by a 5G millimeter wave radio network; and transmitting the second converted signal to a wireless device, wherein the wireless device is disposed in a third region on the second side of the barrier, and wherein a distance between the wireless device and the second side of the barrier is less than a distance between the wireless device and the first side of the barrier.

2. The method of claim 1, wherein the barrier comprises an obstacle occluding line-of-sight between the wireless device and a transmitter broadcasting the millimeter wave signal to the first receiver.

3. The method of claim 1, wherein:
the first receiver is a first transceiver; and
the second receiver is a second transceiver.

4. The method of claim 1, wherein the wireless transmission protocol comprises a 3GPP protocol stack.

5. The method of claim 1, wherein the conversion protocol comprises a CPRI protocol stack.

6. The method of claim 1, wherein the first receiver includes an impedance matching circuit to match input impedance of the first receiver, and the impedance matching circuit is configured to match impedance of millimeter wave signals to receive only the millimeter wave signal and reject all other radio signals.

7. The method of claim 1, wherein the conversion protocol comprises a CPRI protocol stack, and wherein the wireless transmission protocol comprises a 3GPP protocol stack that is reverse converted up to a packet data convergence protocol (PDCP) layer.

8. A computer program product for improving wireless service within a region separated from a wireless transmission point by a barrier that obstructs or degrades a wireless signal, the computer program product comprising:
a non-transitory computer-readable storage medium, storing program codes executed by a processor, to perform:
receiving, at a first receiver that is programmed with a SIM card or other mechanism to only decode millimeter wave signals for a specific wireless service provider, a millimeter wave signal, wherein:
the millimeter wave signal is a first signal;
the first signal comprises a wireless transmission protocol having a stack layer;
the first receiver is disposed in a first region; and
the first region is disposed on a first side of the barrier, wherein the barrier comprises an energy absorbing material comprising at least one of a high energy efficient building material, a window pane, a window frame, or a door frame that obstructs the millimeter wave signal;
authenticating the millimeter wave signal to verify the specific wireless service provider;

amplifying the millimeter wave signal after authentication;

converting an amplified millimeter wave signal to at least one of an optical signal or an electrical signal, wherein:
the first signal is converted from the wireless transmission protocol to a conversion protocol; and
the conversion protocol preserves the first signal's stack layer;

recreating an original provider specific protocol and generating a millimeter wave wireless signal that exceeds an original wireless RF signal, wherein the millimeter wave wireless signal includes network parameters enabling a wireless device to decode a Primary Synchronization Signal (PSS), a Secondary Synchronization Signal (SSS), an Evolved Cell Global Identity (eCGI), a Physical Cell Identity (PCI), and a Root Sequence Index (RSI) for authentication by a 5G millimeter wave radio network; and transmitting the optical signal or the electrical signal on a conduit to a second receiver, wherein:
the second receiver is disposed in a second region; and
the second region is disposed on a second side of the barrier;

converting the optical or electrical signal from the conversion protocol back to the wireless transmission protocol; and transmitting the second converted signal to a wireless device, wherein the wireless device is disposed in a third region on the second side of the barrier, and wherein a distance between the wireless device and the second side of the barrier is less than a distance between the wireless device and the first side of the barrier.

9. The computer program product of claim 8, wherein the barrier comprises an obstacle occluding line-of-sight between the wireless device and a transmitter broadcasting the millimeter wave signal to the first receiver.

10. The computer program product of claim 8, wherein:
the first receiver is a first transceiver; and
the second receiver is a second transceiver.

11. The computer program product of claim 8, wherein the wireless transmission protocol comprises a 3GPP protocol stack.

12. The computer program product of claim 8, wherein the conversion protocol comprises a CPRI protocol stack.

13. The computer program product of claim 8, wherein the first receiver includes an impedance matching circuit to match input impedance of the first receiver, and the impedance matching circuit is configured to match impedance of millimeter wave signals to receive only the millimeter wave signal and reject all other radio signals.

14. The computer program product of claim 8, wherein the conversion protocol comprises a CPRI protocol stack, and wherein the wireless transmission protocol comprises a 3GPP protocol stack that is reverse converted up to a packet data convergence protocol (PDCP) layer.

15. A system for improving wireless service within a region separated from a wireless transmission point by a barrier that obstructs or degrades a wireless signal, comprising:
a first receiver configured to receive a millimeter wave signal, wherein:
the first receiver is programmed with a SIM card or other mechanism to only decode millimeter wave signals for a specific wireless service provider;

the millimeter wave signal is a first signal;

the first signal comprises a wireless transmission protocol having a stack layer;

the first receiver is disposed in a first region; and the first region is disposed on a first side of the barrier, wherein the barrier comprises an energy absorbing material comprising at least one of a high energy efficient building material, a window pane, a window frame, or a door frame that obstructs the millimeter wave signal;

authentication circuitry communicably coupled to the first receiver and configured to authenticate the millimeter wave signal to verify the specific wireless service provider;

an amplifier communicably coupled to the authentication circuitry and configured to amplify the millimeter wave signal after authentication;

a first converter communicably coupled to the amplifier, the first converter configured to convert an amplified millimeter wave signal to at least one of an optical signal or an electrical signal, wherein:

the first signal is converted from the wireless transmission protocol to a conversion protocol; and the conversion protocol preserves the first signal's stack layer;

a first transmitter coupled to the converter;

a conduit communicably coupled to the first transmitter;

a second receiver communicably coupled to the conduit, wherein the conduit is configured to transmit the optical signal or the electrical signal to the second receiver, wherein:

the second receiver is disposed in a second region; and the second region is disposed on a second side of the barrier;

a second converter communicably coupled to the second receiver and configured to convert the optical or electrical signal from the conversion protocol back to the wireless transmission protocol;

circuitry configured to regenerate an original provider specific protocol and generate a millimeter wave wireless signal, wherein the circuitry is further configured to generate network parameters in the millimeter wave wireless signal enabling a wireless device to decode a Primary Synchronization Signal (PSS), a Secondary Synchronization Signal (SSS), an Evolved Cell Global Identity (eCGI), a Physical Cell Identity (PCI), and a Root Sequence Index (RSI) for authentication by a 5G millimeter wave radio network; and a transmitter communicably coupled to the second converter and configured to transmit the second converted signal to a wireless device, wherein the wireless device is disposed in a third region on the second side of the barrier, and wherein a distance between the wireless device and the second side of the barrier is less than a distance between the wireless device and the first side of the barrier.

16. The system of claim 15, wherein the barrier comprises an obstacle occluding line-of-sight between the wireless device and a wireless service provider transmitter broadcasting the millimeter wave signal to the first receiver.

17. The system of claim 15, wherein:

the first receiver is a first transceiver; and the second receiver is a second transceiver.

18. The system of claim 15, wherein the wireless transmission protocol comprises a 3GPP protocol stack.

19. The system of claim 15, wherein the conversion protocol comprises a CPRI protocol stack.

20. The system of claim 15, wherein the first receiver includes an impedance matching circuit to match input impedance of the first receiver, and the impedance matching circuit is configured to match impedance of millimeter wave signals to receive only the millimeter wave signal and reject all other radio signals.

21. The system of claim 15, wherein the conversion protocol comprises a CPRI protocol stack, and wherein the wireless transmission protocol comprises a 3GPP protocol stack that is reverse converted up to a packet data convergence protocol (PDCP) layer.

* * * * *